United States Patent [19]
Buchanan, Jr.

[11] 3,729,766
[45] May 1, 1973

[54] WINDSHIELD WIPING APPARATUS
[75] Inventor: Harry Charles Buchanan, Jr., Centerville, Ohio
[73] Assignee: General Motors Corporation, Detroit, Mich.
[22] Filed: Oct. 20, 1970
[21] Appl. No.: 82,363

[52] U.S. Cl.............15/250.21, 15/250.25, 15/250.3
[51] Int. Cl...................................................B60s 1/06
[58] Field of Search................15/250.1, 250.1 Y, 15/250.21, 250.25, 250.27, 250.3, 250.13

[56] References Cited
UNITED STATES PATENTS 3,482,275  12/1969  Fux..............................15/250.23 X
3,599,270  8/1971  Mori.................................15/250.23

Primary Examiner—Peter Feldman
Attorney—W. E. Finken and W. A. Schuetz

[57] ABSTRACT

In a preferred form, this disclosure relates to a windshield wiping apparatus for wiping a windshield of an automotive vehicle. The windshield wiping apparatus comprises a windshield wiper and an actuating mechanism including a swingable linkage means for supporting the wiper and for effecting movement of the wiper transversely of the windshield through one portion of its stroke and for arcuately moving the wiper between a generally vertical position toward a generally horizontal position during another portion of its stroke.

2 Claims, 5 Drawing Figures

Patented May 1, 1973

INVENTOR.
H. Charles Buchanan, Jr.
BY
W. A. Schutz
ATTORNEY

Patented May 1, 1973

INVENTOR.
H. Charles Buchanan, Jr.
BY
W. A. Schuetz
ATTORNEY

WINDSHIELD WIPING APPARATUS

The present invention relates to a window wiping apparatus for wiping a window of an automotive vehicle, and in particular to a windshield wiping apparatus having a pair of wipers which are reciprocated through inboard and outboard strokes and in which the wipers are moved transversely of the windshield during one portion of their strokes and are arcuately moved during another portion of their strokes.

An object of the present invention is to provide a new and improved windshield wiping apparatus having a wiper and an actuating mechanism for reciprocating the wiper through inboard and outboard strokes, and in which the actuating mechanism includes a swingable linkage means for supporting the wiper and for effecting movement of the wiper transversely of the windshield during one or the outboard portion of each stroke and arcuately through the other or inboard portion of each stroke.

Another object of the present invention is to provide a new and improved windshield wiping apparatus as defined in the next preceding object and wherein the linkage means comprises first and second spaced, downwardly extending links pivotally supported at one end for movement in opposite directions and a cross link for supporting the wiper and which has its opposite ends pivotally connected to the other ends of the first and second links, and wherein said leakage means when swung in a first direction to cause the wiper to be moved through its inboard stroke first moves the wiper transversely of the windshield during a portion of the stroke until the cross and second links are in longitudinal alignment with each other whereupon further movement of the linkage means in the first direction causes the first link to be moved in the opposite direction and the cross link to be moved toward a position in which it is generally vertically disposed whereby the wiper is caused to be moved in an arcuate path toward its inboard position.

A further object of the present invention is to provide a new and improved windshield wiping apparatus, ad defined in the next preceding object, and wherein the wiper apparatus includes a pair of wipers, each of which is supported by a swingable linkage means, and a drive means operatively connected with the cross links for effecting swinging movement of the linkage means.

Briefly, these and other objects of the present invention are achieved, in the preferred embodiment, by providing swingable linkage means for supporting the wipers and a drive means for reciprocating the linkage means. The linkage means each comprise first and second links having one end pivotally supported by the vehicle and a cross link for supporting the wiper and having its opposite ends pivotally connected to the other end of the first and second links. When the linkage means is reciprocated to move the wipers through their inboard strokes, the first and second links are moved in a first direction to move the cross link and wiper transversely of the windshield until the second and cross links are longitudinally aligned whereupon further movement of the linkage means causes the first link to move in the opposite direction and the cross link to move toward a position in which it is generally vertically disposed whereby the wiper is caused to be arcuately moved towards its inboard position adjacent the lower edge of the windshield. When the linkage means is reciprocated in the other direction to move the wipers through their outboard strokes, the reverse movement of the parts takes place.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

Figure 1:
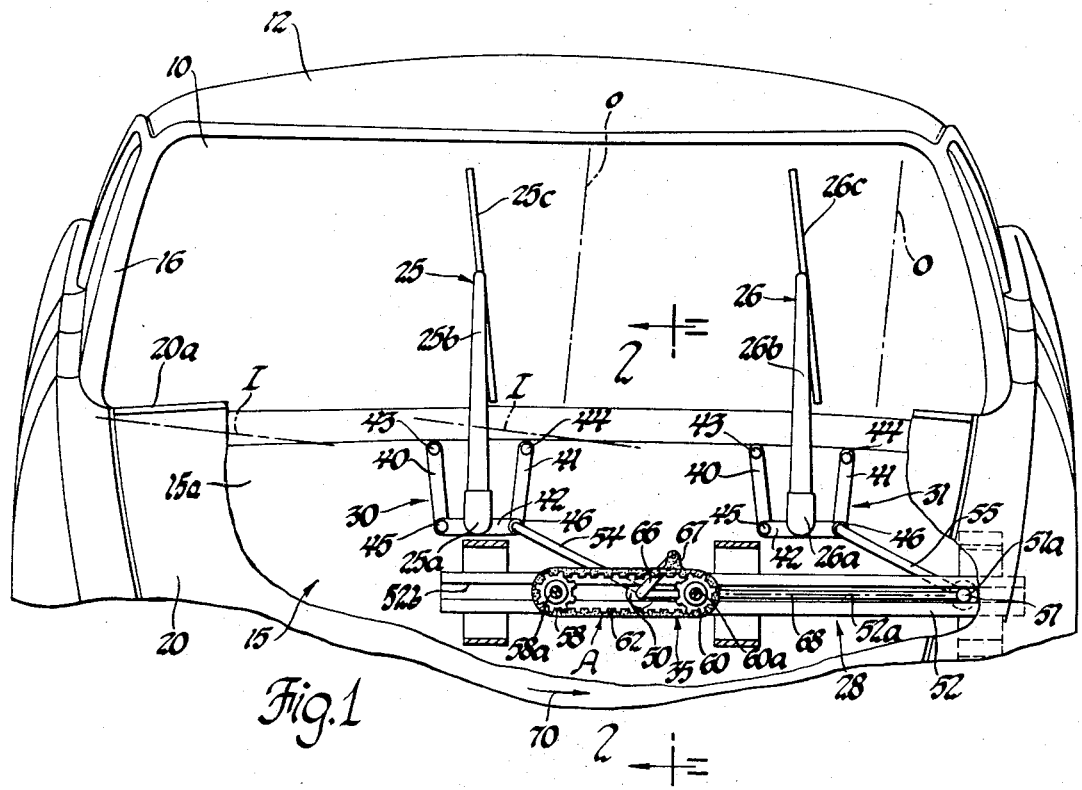
FIG. 1 is a fragmentary front elevational view of an automotive vehicle embodying the novel windshield wiper apparatus of the present invention.
Figure 2:
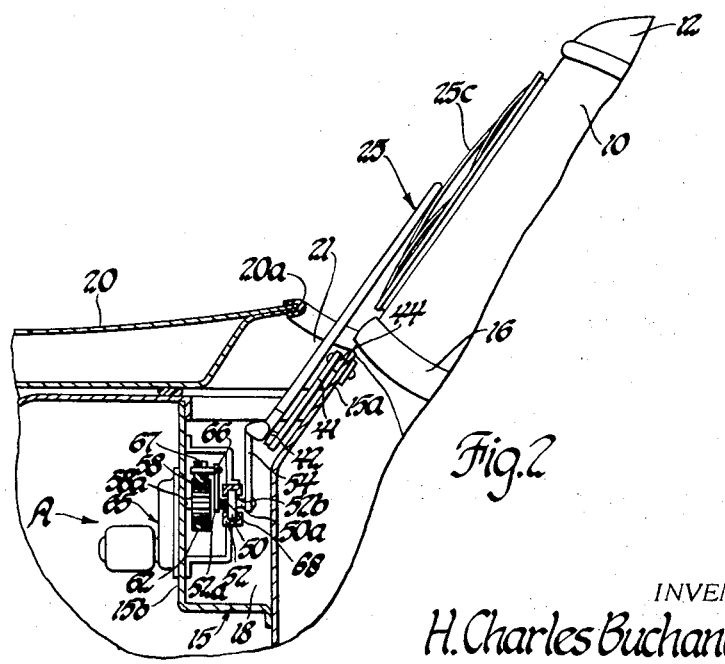
FIG. 2 is an enlarged cross sectional view taken approximately along line 2—2 of FIG. 2.

The present invention provides a novel window wiping apparatus for wiping a window of an automotive vehicle. Although the window wiping apparatus of the present invention could be used for wiping various vehicle windows, it is particularly useful for wiping the windshield of an automotive vehicle and thus, will be herein described and shown as being used for the latter purpose.

As representing a preferred embodiment of the present invention, the drawings show a windshield wiping apparatus A for wiping a windshield 10 of an automotive vehicle 12. The windshield 10 is supported by suitable body structure 15 of the vehicle and its outer periphery is surrounded by a reveal molding 16. The body structure 15 defines a well or chamber 18 adjacent the windshield 10 at its lower edge and in which the windshield wiping apparatus A is housed. The vehicle 12 also includes a forwardly extending hood 20 whose rearward edge 20a is spaced forwardly of the windshield 10 to define a slot 21 extending transversely of the vehicle 12 and which is in communication with the well 18.

The windshield wiping apparatus A comprises, in general, a pair of windshield wipers 25 and 26 and an actuating mechanism 28 for reciprocating the wipers 25 and 26 across the outer surface of the windshield 10 through inboard and outboard strokes between inboard and outboard positions I and O, respectively. The actuating mechanism 28 broadly comprises first and second swingable linkage means 30 and 31 for supporting the wipers 25 and 26, respectively, and a drive mechanism 35 operatively connected with the linkage means 30 and 31 for reciprocating the latter.

The windshield wipers 25 and 26 can be of any suitable or conventional construction and are hereshown as respectively comprising wiper arms having spring hinge connected inner and outer wiper arm sections 25a, 25b and 26a, 26b, and wiper blade holder assemblies 25c and 26c which are carried by the outer arm sections 25b and 26b. The outer arm sections 25b and 26b respectively bias the wiper blade assemblies 25c and 26c into engagement with the outer surface of the windshield 10.

The swingable linkage means 30 and 31 for supporting the wipers 25 and 26 are of an identical construction. Hence, only the swingable linkage means 30 will be described in detail and corresponding parts of the linkage means 31 will be given the same reference numerals.

The linkage means 30 comprises first and second spaced downwardly extending links 40 and 41 and a cross link 42. The downwardly extending links 40 and 41 are pivotally supported at their upper ends for movement in opposite directions by pivot pin means 43 and 44 suitably carried by a panel 15a of the vehicle body structure 15. The cross link 42 is pivotally connected at its opposite ends to the lower ends of the links 40 and 41 via pivot pin means 45 and 46. The links 40 and 41 are of an equal length and the axes of the pivot pin means 43 to 44 lie in a common horizontal plane. The horizontal distance between the axes of the pivot pin means 43 and 44 is slightly greater than the horizontal distance between the axes of the pivot pin means 45 and 46. The inner arm section 25a of the wiper 25 is non-rotatably secured or fixed to the cross link 42 intermediate the ends of the latter and the wiper 25 extends transversely of or normal to the cross link 42.

The linkage means 30 and 31 are adapted to be reciprocated in opposite directions to move the wipers 25 and 26 between their inboard and outboard positions I and O by the drive means 35. The drive means 35 comprises a continuous belt drive for reciprocating a pair of rollers 50 and 51 quided for linear movement by a guide track 52 and a pair of drive links 54 and 55. The continuous belt drive comprises a drive pulley or sprocket 58, an idler pulley or sprocket 60 and an endless belt 62. The pulleys 58 and 60 are fixed to shafts 58a and 60a rotatably journaled in housing secured to a panel 15b of the vehicle support structure 15 and the endless belt 62 is trained around the pulleys 58 and 60. The shaft 58a of the drive pulley 58 is operatively connected with a suitable or conventional electric motor and gear reduction unit 65.

The endless belt 62 is drivingly connected with the roller 50 by a link 66. The link 66 has one end pivotally connected to a bracket 67 secured to the endless belt 58 and the other end pivotally connected to a shaft 50a carried by the roller 50. The roller 51 is drivingly connected with the roller 50 by a link 68. The link 68 has its opposite ends pivotally connected to the shaft 50a of the roller 50 and a shaft 51a carried by the roller 51. The links 54 and 55 are swivelly connected by ball and socket joints at their lower ends to the shafts 50a and 51a of the rollers 50 and 51 and at their upper ends are swivally connected by ball and socket joints to the pivot pin means 46 of the linkage means 30 and 31, respectively. The guide track 52 has elongated slots 52a and 52b extending longitudinally along its sides and through which the shaft 50a and 51a of the rollers 50 and 51 extend. The guide track is suitably supported by the vehicle body structure 15.

The endless belt 62 is continuously moved in the direction of the arrow 70 when the drive pulley 58 is rotated in response to energization of the wiper motor 55. Movement of the belt 62 in the direction of the arrow 70 causes the roller 50 and the roller 51 by virtue of its being drivingly connected to the roller 50 by the link 68 to be reciprocated back and forth within the guide track 52. Reciprocation of the drive rollers 50 and 51 causes the links 54 and 55 to reciprocate the linkage means 30 and 31 in opposite directions.

Figure 3:
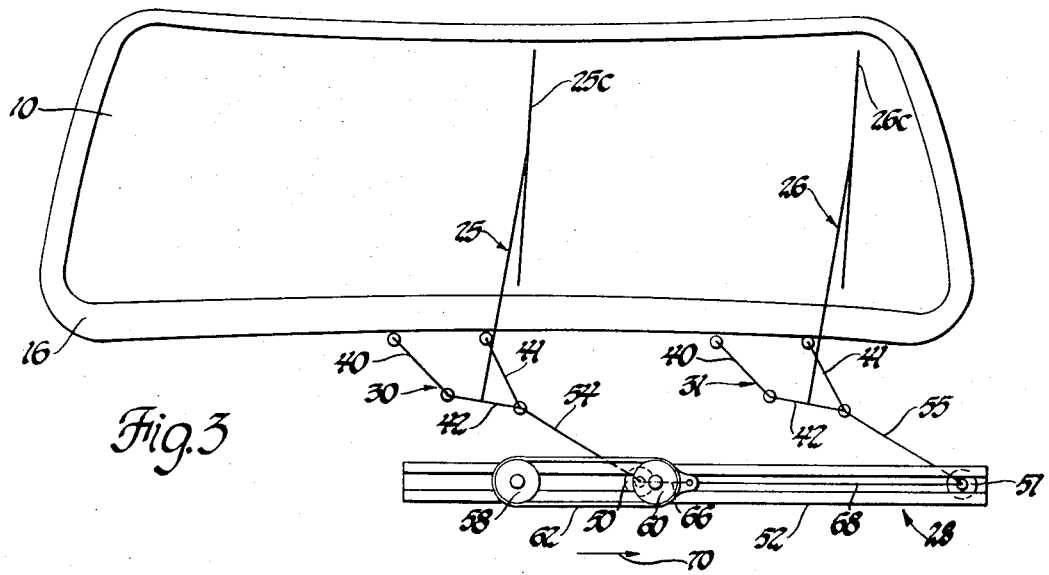
FIGS. 3–5 are schematic views of the windshield wiper apparatus of the present invention and showing different parts thereof in different positions.
Figure 4:
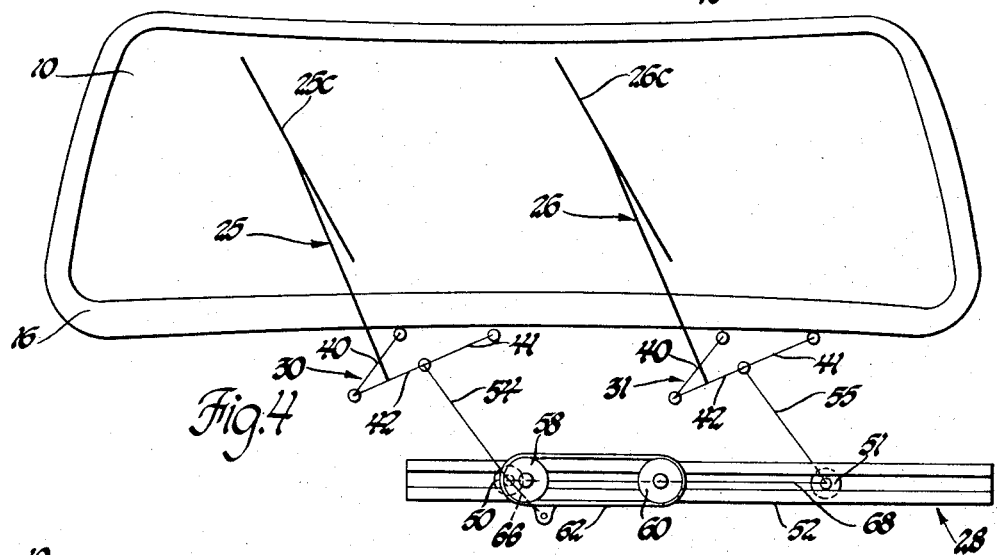
Figure 5:
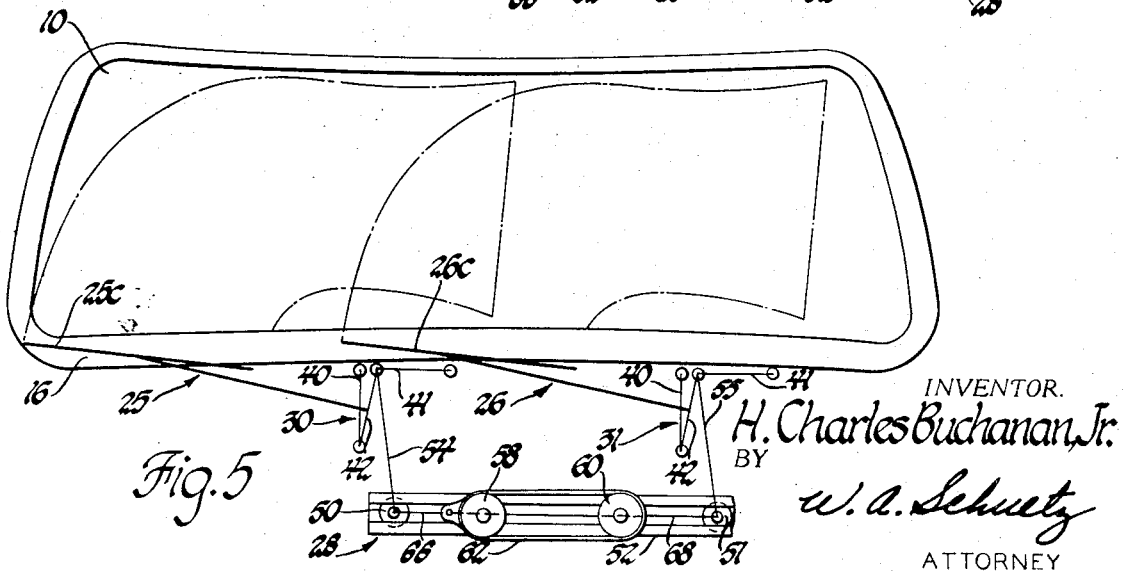

Operation of the wiper apparatus A will be described with reference to the schematic views thereof shown in FIGS. 3-5. FIGS. 3-5 respectively show the wipers 25 and 26 in their outboard, intermediate and inboard positions.

When the linkage means 30 and 31 are moved in a first or clockwise direction, movement of the wipers 25 and 26 through their inboard stroke from their outboard position, as shown in FIG. 3, is effected. When the linkage means 30 and 31 are moved in the clockwise direction the links 40 and 41 thereof are moved in the clockwise direction which causes the cross link 42 to be swung toward the left, as shown in the drawings. Movement of the cross link 42 toward the left causes the wipers 25 and 26 to be moved toward the left and transversely of the windshield 10 during their first or outboard portion of their inboard strokes. It should be noted that the wipers 25 and 26 are also pivoted somewhat in a counterclockwise direction during movement through the first portion of their inboard strokes, but that the primary movement of the wipers is transversely of the windshield 10.

This movement of the windshield wipers 25 and 26 transversely of the windshield 10 takes place until the cross link 42 and the link 41 of the linkage means 30 and 31 are longitudinally aligned with each other, as shown in FIG. 4. Further movement of the linkage means 30 and 31 in the first or clockwise direction causes the links 40 and the cross links 42 to be moved in the counterclockwise direction while the link 41 continues to move in a clockwise direction. As the cross link 42 moves in a counterclockwise direction it moves toward a position in which it is generally vertically disposed, as shown in FIG. 5. During the movement of the links 40 and 42 in a counterclockwise direction, the wipers 25 and 26 are caused to be arcuately moved through the latter or inboard portion of their inboard strokes until they are positioned in their inboard position, which position is generally horizontally with respect to the lower edge edge of the windshield 10. This inboard position I is also the park position.

When the linkage means 30 and 31 are moved in a second or counterclockwise direction the reverse movement of the links 40, 41 and 42 of the linkage means and the wipers occurs. That is, the wipers are caused to be arcuately moved during the first portion of their outboard strokes and then transversely moved relative to the windshield 10 during the latter portion of their outboard strokes.

An advantage of the windshield wiper apparatus A is that a greater area of the windshield 10 can be wiped as compared to a conventional oscillatory windshield wiper system. Also, the windshield wiper drive motor would include a conventional park switch to maintain the motor energized when wiper operation is no longer desired until the wipers reach their inboard or park position.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A windshield wiping apparatus for wiping a windshield of an automotive vehicle comprising: a windshield wiper; an actuating mechanism operatively connected with the windshield wiper for reciprocating the same across the outer surface of the windshield between inboard and outboard positions, said actuating mechanism comprising a linkage means having first and second spaced, downwardly extending links pivotally supported at one end for movement in opposite directions and a cross link having its opposite ends pivotally connected to the other ends of said first and second links, said wiper being secured to said cross link and extending transversely thereof, and a drive means operatively connected with said cross link for reciprocating the linkage means, said first and second links of said linkage means upon being moved in a first direction by said drive means causing said wiper to be moved generally horizontally across the windshield through a first portion of its inboard stroke until said second and cross links are longitudinally aligned with each other whereupon further movement of said linkage means by said drive means in said first direction causes said first link to be moved in the opposite direction and said cross link to be moved toward a position in which it is generally vertically disposed whereby said wiper is arcuately moved through the latter portion of its inboard stroke toward a generally horizontal position adjacent the lower edge of the windshield.

2. In combination, an automotive vehicle having a windshield supported by its body structure and a windshield wiping apparatus supported by the body structure for wiping the windshield of the vehicle, said windshield wiping apparatus comprising: a pair of windshield wipers, an actuating mechanism operatively connected with the windshield wipers for reciprocating the same through inboard and outboard strokes between an outboard position and an inboard position in which the wipers are generally horizontally disposed adjacent the lower edge of the windshield, said actuating mechanism comprising first and second linkage means, each of said linkage means having first and second spaced downwardly extending links pivotally connected at one end to said body structure for movement in opposite directions and a cross link having its opposite ends pivotally connected to the other ends of said first and second links, the distance between the pivotal connection of said one end of said first and second links being greater than the distance between the pivotal connections of said cross link to said first and second links, each of said cross links non-rotatably supporting one of said wipers and with the latter extending transversely thereof, and a drive means operatively connected with the cross links at their pivotal connection with said second links for reciprocating the linkage means, said first and second links of each of said linkage means upon being moved in a first direction by said drive means causing said wipers to be moved generally horizontally across the windshield through a first portion of its inboard stroke until said second and cross links are longitudinally aligned with each other whereupon further movement of said first and second linkage means in said first direction causes said first link thereof to be moved in the opposite direction and said cross link to be moved toward a position in which it is generally vertically disposed whereby said wipers are arcuately moved through the latter portion of their inboard stroke toward their inboard generally horizontal position adjacent the lower edge of the windshield.

* * * * *